March 19, 1929.  C. F. SUMMY  1,706,195
AUTOMOBILE SHOCK ABSORBER
Filed March 17, 1927   3 Sheets-Sheet 1
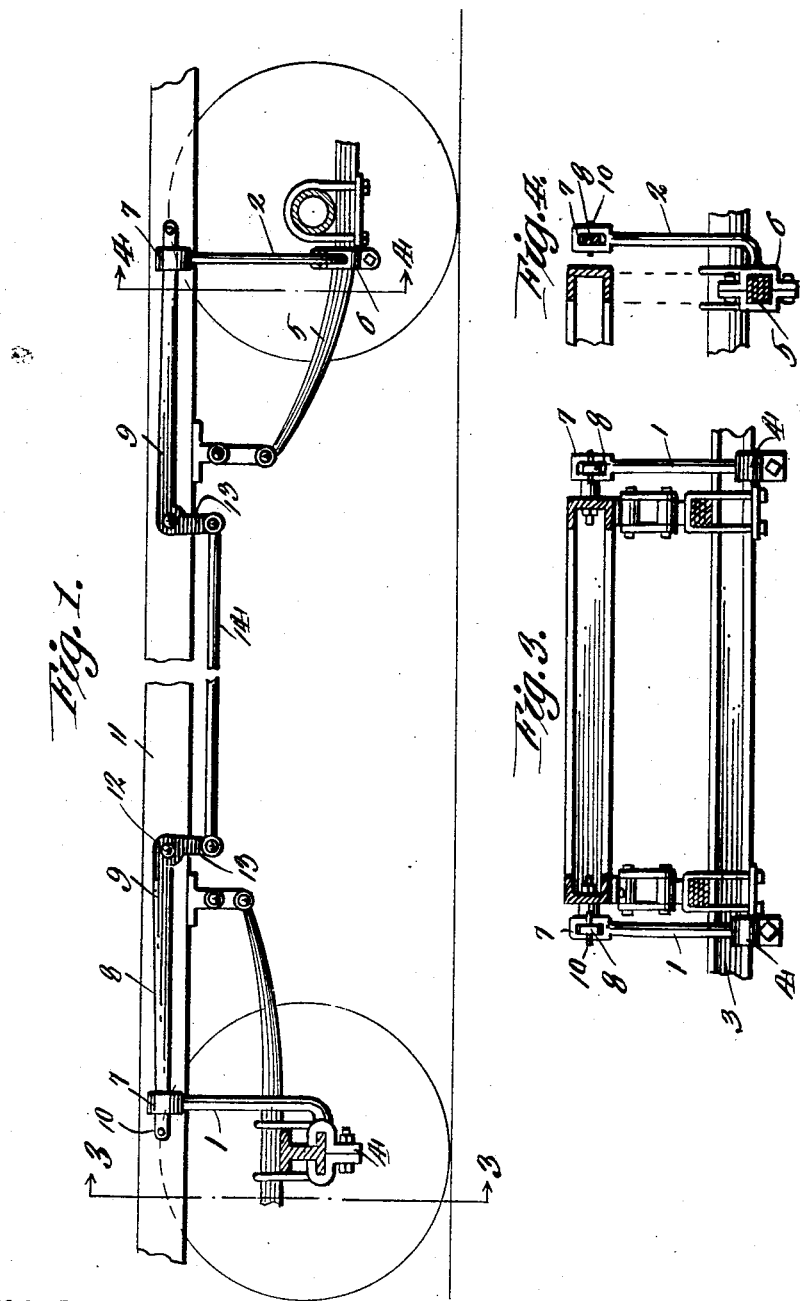
INVENTOR
CHARLES F. SUMMY March 19, 1929. C. F. SUMMY 1,706,195
AUTOMOBILE SHOCK ABSORBER
Filed March 17, 1927   3 Sheets-Sheet 2
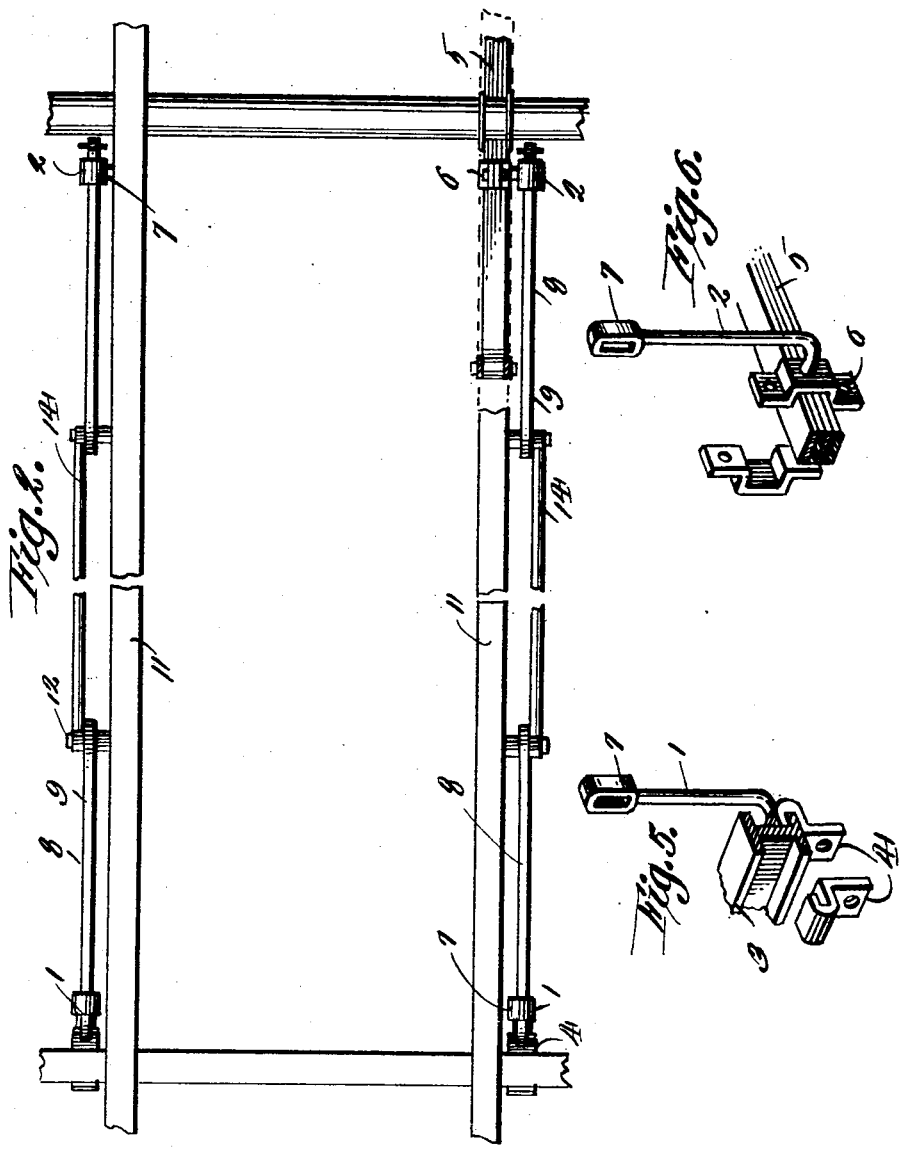

March 19, 1929. C. F. SUMMY 1,706,195
AUTOMOBILE SHOCK ABSORBER
Filed March 17, 1927 3 Sheets-Sheet 3
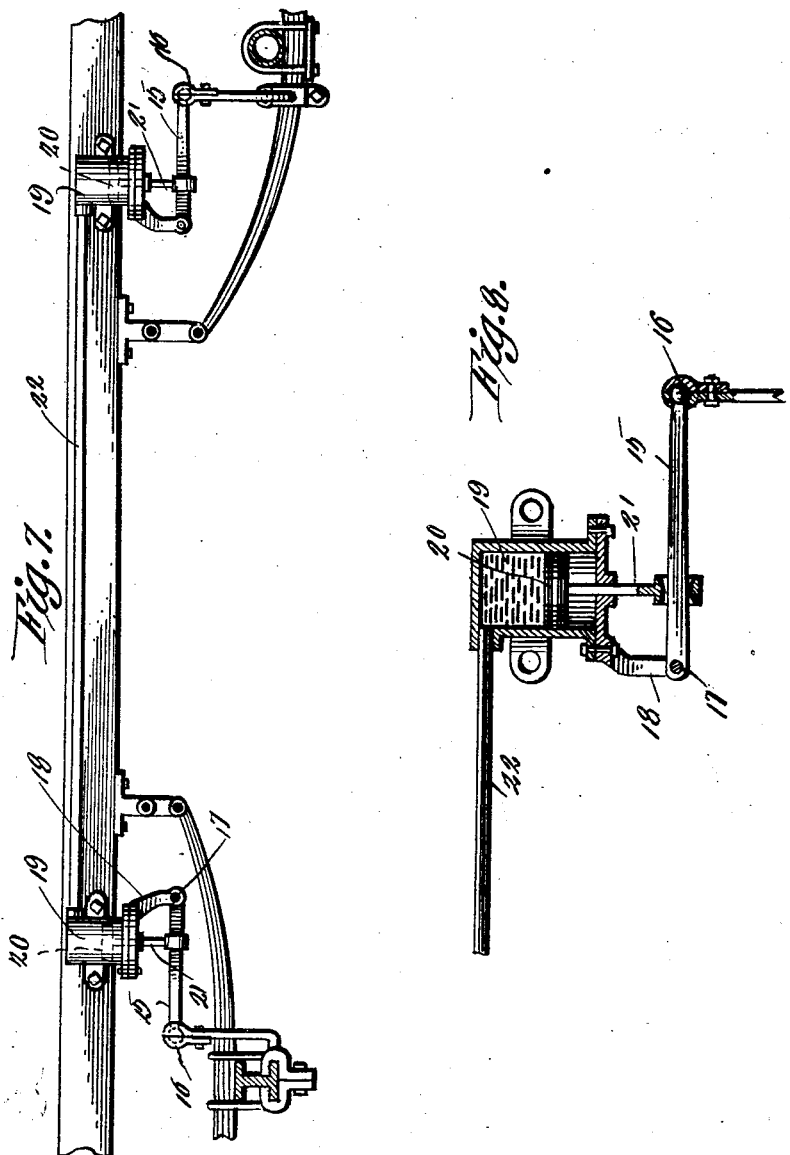
WITNESSES
Inventor
CHARLES F. SUMMY
By Richard B. Owen, Attorney Patented Mar. 19, 1929.

1,706,195

UNITED STATES PATENT OFFICE.

CHARLES F. SUMMY, OF SUTTER, CALIFORNIA.

AUTOMOBILE SHOCK ABSORBER.

Application filed March 17, 1927. Serial No. 176,153.

This invention relates to a shock absorber for automobiles, and has for its primary object a construction whereby the front and rear springs will be connected in groups in a manner to subject the springs of either group to a uniform tension approximately simultaneously.

An object of the invention is the provision of novel mechanism between a front spring and a rear spring whereby any motion of either spring will be transmitted to the other spring in a manner to effect equal distribution of the strain.

Another object of the invention is the novel manner of arranging and connecting the various parts so that they may be of substantial construction throughout to withstand the rough usage to which devices of this character are subjected.

A feature of my invention is the simplified manner in which the devices may be connected to automobiles now in use without in any way changing or affecting the design or construction of the automobile.

With these and other objects in view, my invention will be better understood from the accompanying drawings, wherein:—

Figure 1 is a side elevation of the shock-absorbing mechanism shown in applied position;

Figure 2 is a top plan view;

Figure 3 is a sectional view on the line 3—3 of Figure 1;

Figure 4 is a sectional view on the line 4—4 of Figure 1;

Figure 5 is a detail perspective view of the front clamp;

Figure 6 is a detail perspective view of the rear clamp;

Figure 7 is a side elevation of a modified form of my invention capable of utilizing the hydraulic properties of a fluid;

Figure 8 is a sectional view of that construction of my invention shown in Figure 7.

Again referring to the drawings illustrating my invention, and more particularly to Figures 1 to 6 inclusive, the numeral 1 designates front uprights, while the numeral 2 designates rear uprights, the former secured to the front axle 3 by the separable jaws 4 and the latter secured to the rear springs 5 by the detachable jaws 6. I wish to call particular attention to the fact that the jaws for the uprights 2 may be adjusted along the springs 5 to regulate the action thereof on the springs and thereby control the flexibility. Each clamp has its upper end formed into an eye 7, in which is slidably received the free end portion of the long arm 8 of an angle lever 9, a pin 10 being secured through the end of the said arm to prevent complete disengagement of the eye 7 in the sliding movement of the eye on the lever arm to compensate for the angular displacement of the lever which is pivoted upon the frame 11 of the automobile, as indicated at 12.

The short arms 13 of the angle levers are connected together by a connecting rod 14 so that any motion of one of the levers will be positively and uniformly transmitted to the other lever. In the functioning of my improved shock absorber, any displacement of either end of the front axle of the automobile will be transmitted to the respective upright 1, which will cause rocking of the angle lever associated therewith. This rocking of the lever will move the rod 14 in a direction to rock the other angle lever in a manner to depress its associated upright, and as the upright 2 is secured to the respective spring 5, the latter will be flexed and its resiliency added to the resiliency of the front spring so that any shocks to which the front axle is subjected are transmitted to the rear springs so that the strain incident to the shock will be distributed between the springs. Due to the positive manner in which the various parts are connected, lost motion is positively eliminated and a uniform movement of the different parts is assured.

It is, of course, to be understood that the uprights may be secured in other relations with the various parts of the automobile, as the main feature of my invention resides in providing a set of uprights and interconnecting them in a manner to uniformly transmit motion from one upright to the other.

In Figures 7 and 8, I have shown the invention designed to utilize the hydraulic properties of a fluid. In this particular construction, I continue to use the front and rear clamps in their relative position, as illustrated in Figure 1, but I dispense with the bell crank levers and substitute therefor the ordinary straight lever 15 that has a sliding connection 16 with its associated clamps and a pivotal connection 17 with a bracket 18 projecting from a cylinder 19. Slidably mounted in the cylinder 19 is a piston 20, the stem 21 of which is connected to the lever 15. Communication is established between the front and rear cylinders by the pipe 22 so that the fluid may be interchanged from one cylinder to the other according to the direction of travel of the pistons.

With this construction, it will be appreciated that motion is transmitted from the front mechanism to the rear mechanism through the medium of a fluid, thereby dispensing with any mechanical connection between the front and rear mechanisms.

It is, of course, to be understood that my invention may be designed in various other manners than illustrated and motion may be transmitted from the front to the rear mechanism in various ways and, therefore, I do not desire to be limited in any manner except as set forth in the following claims.

I claim:—

1. Shock absorbing mechanism for automobiles comprising an upright fixed with relation to the front spring of the automobile, a second upright fixed with relation to the corresponding rear spring of the automobile, a pair of angle levers pivotally mounted upon the frame of the automobile and each having an arm slidably connected with a respective one of the said uprights, and a rod connecting the other arms of said levers for rocking movement in unison.

2. In shock absorbing mechanism for automobiles, the combination with the front and rear springs of the automobile and the side members of the chassis frame thereof, of uprights fixed with respect to the front and rear springs, angle levers mounted on each side member of the chassis frame and each including a long arm, the long arms of the levers extending in opposite directions and slidably engaging the respective uprights, the levers having depending shorter arms, and a rod extending between and connecting the shorter arms of the levers.

3. In shock absorbing mechanism for automobiles, the combination with the front and rear springs of the automobile and the side members of the chassis frame thereof, of uprights fixed with respect to the front and rear springs, angle levers mounted on each side member of the chassis frame and each including a long arm, the long arms of the levers extending in opposite directions and slidably engaging the respective uprights, the levers having depending shorter arms, a rod extending between and connecting the shorter arms of the levers, and means for limiting the sliding movement of the first mentioned arms of said levers with respect to the respective uprights.

4. Shock absorbing mechanism for automobiles comprising, in combination with the front and rear springs of the automobile and the side bars of the chassis frame thereof, uprights fixed with relation to respective ones of the front and rear springs and provided at their upper ends with eyes, angle levers pivotally mounted upon the corresponding side bar of the chassis frame, each of said levers including a long arm extending beside the respective side bar of the chassis frame and a depending short arm, the levers being arranged with their long arms extending in opposite directions and slidably engaged through the eyes of respective ones of the uprights, and a rod extending between and connecting the shorter arms of the levers.

5. Shock absorbing mechanism for automobiles comprising, in combination with the front and rear springs of the automobile and the side bars of the chassis frame thereof, uprights fixed with relation to respective ones of the front and rear springs and provided at their upper ends with eyes, angle levers pivotally mounted upon the corresponding side bars of the chassis frame, each of said levers including a long arm extending beside the respective side bar of the chassis frame and a depending short arm, the levers being arranged with their long arms extending in opposite directions and slidably engaged through the eyes of respective ones of the uprights, a rod extending between and connecting the shorter arms of the levers, and an abutment member upon the outer end of the longer arm of each lever to restrict the retractive sliding movement of said arm from the respective eye.

In testimony whereof I affix my signature.

CHARLES F. SUMMY.